United States Patent
Maca

(10) Patent No.: US 8,559,485 B2
(45) Date of Patent: Oct. 15, 2013

(54) AUTOREGRESSIVE SIGNAL PROCESSING FOR REPEATER ECHO CANCELLATION

(75) Inventor: Gregory Allan Maca, Lynchburg, VA (US)

(73) Assignee: Andrew LLC, Hickory, NC (US)

( * ) Notice: Subject to any disclaimer, the term of this patent is extended or adjusted under 35 U.S.C. 154(b) by 193 days.

(21) Appl. No.: 13/081,654

(22) Filed: Apr. 7, 2011

(65) Prior Publication Data
US 2011/0249708 A1 Oct. 13, 2011

Related U.S. Application Data

(60) Provisional application No. 61/322,095, filed on Apr. 8, 2010.

(51) Int. Cl.
*H04B 17/02* (2006.01)

(52) U.S. Cl.
USPC .......................... 375/213; 375/211; 375/295

(58) Field of Classification Search
USPC ............ 375/213, 211, 295, 317, 178; 455/24, 455/11.1, 15, 7; 370/492, 279, 293, 315; 379/338
See application file for complete search history.

(56) References Cited

U.S. PATENT DOCUMENTS

| | | | |
|---|---|---|---|
| 3,593,138 A * | 7/1971 | Dunn et al. ................... | 375/211 |
| 5,043,814 A | 8/1991 | Lish | |
| 5,117,401 A | 5/1992 | Feintuch | |
| 5,648,987 A | 7/1997 | Yang et al. | |
| 5,796,760 A * | 8/1998 | Wiedeman et al. ........... | 375/130 |
| 7,002,897 B2 | 2/2006 | Jones et al. | |
| 7,043,203 B2 | 5/2006 | Miquel et al. | |
| 7,079,576 B2 | 7/2006 | Bologna | |
| 7,346,013 B2 | 3/2008 | Garmany | |
| 7,430,258 B2 | 9/2008 | Thomas, Jr. | |
| 7,480,486 B1 * | 1/2009 | Oh et al. .......................... | 455/7 |
| 7,596,352 B2 | 9/2009 | Ding et al. | |

(Continued)

FOREIGN PATENT DOCUMENTS

| | | |
|---|---|---|
| WO | WO02078312 | 10/2002 |
| WO | WO2004100471 | 11/2004 |
| WO | WO2007102684 | 9/2007 |
| WO | WO2008091556 | 7/2008 |

OTHER PUBLICATIONS

Fifteen-page International Search Report for PCT/US2011/031715 mailed Jul. 22, 2011.
Six-page; Paul Bourke; "AutoRegression Analysis (AR)"; Nov. 1998; Retrieved from internet: http://paulbourke.net/miscellaneous/ar/.

(Continued)

*Primary Examiner* — Shuwang Liu
*Assistant Examiner* — Helene Tayong
(74) *Attorney, Agent, or Firm* — Wood, Herron & Evans, LLP

(57) ABSTRACT

A method and apparatus to address multipath interference in a communication system is provided. The method comprises measuring an error signal in a signal path of the repeater, wherein the error signal contains desired communication signals, noise signals, and multipath coupling interference signals, computing a power spectrum of the measured error signal, and estimating a response of the multipath coupling interference by processing the power spectrum of the measured error signal using autoregressive estimation in the frequency domain. The method further comprises computing a plurality of FIR filter coefficients from the estimated response and applying the plurality of filter coefficients to an adjustable filter that generates a cancellation signal used to at least partially mitigate the multipath coupling interference signals.

26 Claims, 4 Drawing Sheets

(56) References Cited

U.S. PATENT DOCUMENTS

| | | |
|---|---|---|
| 7,853,195 B2 | 12/2010 | Higgins |
| 7,911,985 B2 | 3/2011 | Proctor, Jr. et al. |
| 2002/0191779 A1 | 12/2002 | Pham |
| 2004/0062317 A1 | 4/2004 | Uesugi et al. |
| 2008/0176513 A1 | 7/2008 | Braithwaite et al. |
| 2009/0291632 A1 | 11/2009 | Braithwaite et al. |
| 2010/0091822 A1 | 4/2010 | Cookman et al. |

OTHER PUBLICATIONS

Twenty-page; John Makhoul, "Linear Prediction: A Tutorial Review"; Proceedings of the IEEE, vol. 63, No. 4, Apr. 1975.

Five-page; Ali Hazmi, et al.; "Cancellation of Loop Interference With Exponential Profile Using Autocorrelation Method in OFDM Based Systems"; Communications Systems, 2004, ICC 2004, The Ninth International Conference on Singapore, China; Sep. 6-8, 2004.

* cited by examiner

AUTOREGRESSIVE SIGNAL PROCESSING FOR REPEATER ECHO CANCELLATION

CROSS-REFERENCE TO RELATED APPLICATION

This application is related to and claims the filing benefit of U.S. Patent Application Ser. No. 61/322,095 to Gregory Allan Maca entitled "AUTOREGRESSIVE SIGNAL PROCESSING FOR REPEATER ECHO CANCELLATION" and filed on Apr. 8, 2010, which application is incorporated by reference in its entirety herein.

FIELD OF THE INVENTION

The present invention relates to communication systems, such as repeaters and distributed antenna systems generally as well as, more specifically, signal processing for echo cancellation in such communication systems.

BACKGROUND OF THE INVENTION

Repeaters, distributed antenna systems, and similar systems are communication systems that are used to extend wireless signal coverage into areas where the RF signal penetration from base transceiver stations (BTS) is often limited or absent. For example, an overall wireless communication system may consist of a plurality of base transceiver stations (BTS) or base stations that communicate with each other and with User Equipment (UE), such as cellular phones, to provide a defined coverage area. In such coverage areas, there are often smaller geographical areas that have very low signal coverage, as provided by one or more of the base stations. Those areas, for example, might be inside buildings, in tunnels, in shadowed areas that are behind mountains or other obstructions, and in underground train systems, as well as various other isolated areas. Rather than simply implementing another costly and large base station to provide coverage in such low signal areas, repeaters and distributed antenna systems are often utilized.

One particular issue to be addressed within a repeater is the feedback signal that comes directly from the coverage antenna back to the donor antenna (or vice-versa for the uplink traffic). Because the feedback signal in an on-frequency repeater system is generally the same frequency as the input signal, it is considered co-channel interference, and cannot be removed by conventional filtering techniques. The feedback path for the feedback signal can occur via a direct path (e.g., a path directly from the transmit antenna to the receive antenna) or a reflected path (e.g., a path where the signal is reflected off one or more object before being received). The feedback signals received from the direct path and the reflected paths, together, are called multipath interference. Under specific conditions, the components of the multipath interference are amplified upon retransmission, overwhelming the desired signal or leading to system oscillation or other system instability.

To remove the multipath interference without corrupting the desired uplink or downlink signals, the multipath signals of the multipath interference must be subtracted from any received signal or input signals so as to only repeat the desired signals.

It would therefore be desirable for the communication system or a portion thereof to mitigate such multipath signals to prevent the retransmission thereof.

SUMMARY OF THE INVENTION

Embodiments of the invention are directed to method and apparatus for addressing multipath feedback in a communication system. The method comprises measuring an error signal in a signal path of the repeater, wherein the error signal contains desired communication signals, noise signals, and multipath coupling interference signals, computing a power spectrum of the measured error signal, and estimating a response of the multipath coupling interference by processing the power spectrum of the measured error signal using autoregressive estimation in the frequency domain. The method further comprises computing a plurality of FIR filter coefficients from the estimated response and applying the plurality of filter coefficients to an adjustable filter that generates a cancellation signal used to at least partially mitigate the multipath coupling interference signals.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Embodiments of the invention are configured to determine filter coefficients for mitigation of multipath interference signals, such as, direct feedback signals and/or echo signals, in a signal repeating system. In particular, embodiments of the invention utilize autoregressive estimation in the frequency domain to determine those filter coefficients. Specifically, a signal received by a signal repeating system can be broken down into two components: a desired signal component (e.g. a communication signal) and a noise component (e.g. internally generated noise). This can be accomplished, for example, by examining the power spectrum of the received signal. Those portions above a threshold can be considered a desired signal component and those portions below a threshold can be considered a noise component. One embodiment of this invention excludes the desired signal components from the power spectrum and estimates the filter coefficients using autoregressive estimation in the frequency domain using only the noise components. In a second embodiment of this invention, the desired signal component is again removed but this time is replaced with an interpolated version of the noise. Autoregressive estimation in the frequency domain can then be used to estimate the filter coefficients. In any event, the filter coefficients are applied to an adjustable filter to address and/or alleviate the multipath interference, and to cancel or reduce echo signals and interference.

Figure 1:
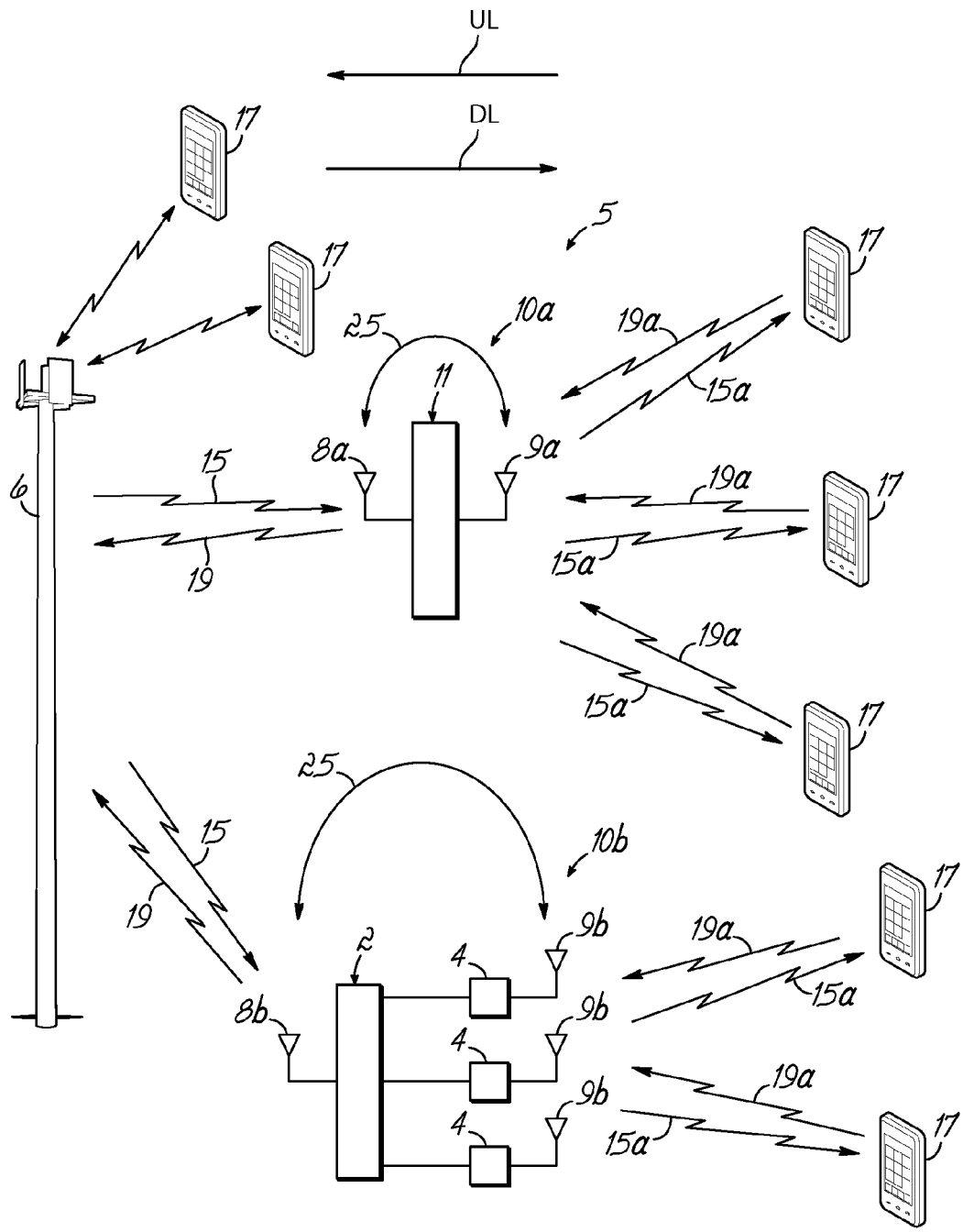
FIG. 1 illustrates a signal repeating system for use in a wireless communication system consistent with embodiments of the invention.

For example, referring to FIG. 1, a wireless communication system 5 for implementing embodiments of the invention is shown. Wireless communication system 5 might include a base station or tower 6, that communicates with a signal repeating system 10. In specific embodiments the system 10 can include a repeater 10a or a distributed antenna system 10b. When the system 10 is configured as a repeater 10a, it is configured with one or more donor antennas 8, one or more coverage antennas 9, and processing electronics 11 that are positioned between the antennas to process and amplify the repeated signal. Accordingly, downlink (DL) wireless signals 15, which include desired communication signals to be repeated, are received by the donor antenna 8a of the repeater 10a and repeated through the coverage antenna 9a as downlink signals 15a. Multipath coupling interference signals 25 (also referred to as "echo" signals 25), are also received at the donor antenna 8a. However, one object of the invention is to remove or at least partially mitigate the multipath coupling interference signals 25 to prevent them from being repeated through the coverage antenna 9a. In any event, the downlink signals 15a are received by one or more wireless communication devices or User Equipment (UE) devices 17, such as cellular phones. Similarly, in an uplink (UL) direction, as indicated by reference numerals 19 and 19a, the wireless devices 17 communicates signals back to the coverage antenna 9a and the repeated signal 19 is then provided via the donor antenna 8a as an uplink signal back to the base station 6.

When the system 10 is configured as a distributed antenna system 10b, on the other hand, it is configured with one or more master units 2 connected to a plurality of remote units 4. The master unit 4 includes one or more donor antennas 8b that receive wireless signals 15, which include the desired communication signals to be repeated, and transmits the signals to the remote units 4. The remote units 4, in turn, repeat the wireless signals through one or more coverage antennas 9b as downlink signals 15a. Again, Multipath coupling interference signals 25 (also referred to as "echo" signals 25), are also received at the donor antenna 8b. However, one object of the invention is to remove or at least partially mitigate the multipath coupling interference signals at the master unit 2 or the remote unit 4. Moreover, and also as discussed above, the downlink signals 15a are received by one or more wireless communication devices or User Equipment (UE) devices 17, such as cellular phones. Similarly, in an uplink (UL) direction, as indicated by reference numerals 19 and 19a, the wireless devices 17 communicates signals back to the coverage antenna 9b which communicates the signals to the master unit 4 that, in turn, repeats the signal via the donor antenna 8b as an uplink signal back to the base station 6. In some embodiments, the repeater 10a and distributed antenna system 10b may function as a multiple-input and multiple-output ("MIMO") system and thus may include multiple antennas 8a, 8b or 9a, 9b to effect such MIMO communications. Alternatively, the repeater 10a and distributed antenna system 10b may function as a single-input and single-output ("SISO") system, a single-input and multiple-output ("SIMO") system, or a multiple-input and single-output ("MISO") system.

Thus, as would be readily understood by a person of ordinary skill in the art, signal repeating systems 10 can take many different forms. More specifically, the signal repeating system 10 may be a "same frequency" signal repeating system configured to receive and repeat a signal such that the received signal and the repeated signal are at the same frequencies, or the signal repeating system 10 may be a "frequency translating" signal repeating system configured to receive and repeat a signal such that the received signal and the repeated signal are at difference frequencies. However, for the sake of simplicity, embodiments of the invention will be described with respect to the system 10 configured as a repeater 10a, though this is not intended to limit alternative embodiments of the invention.

Figure 2:
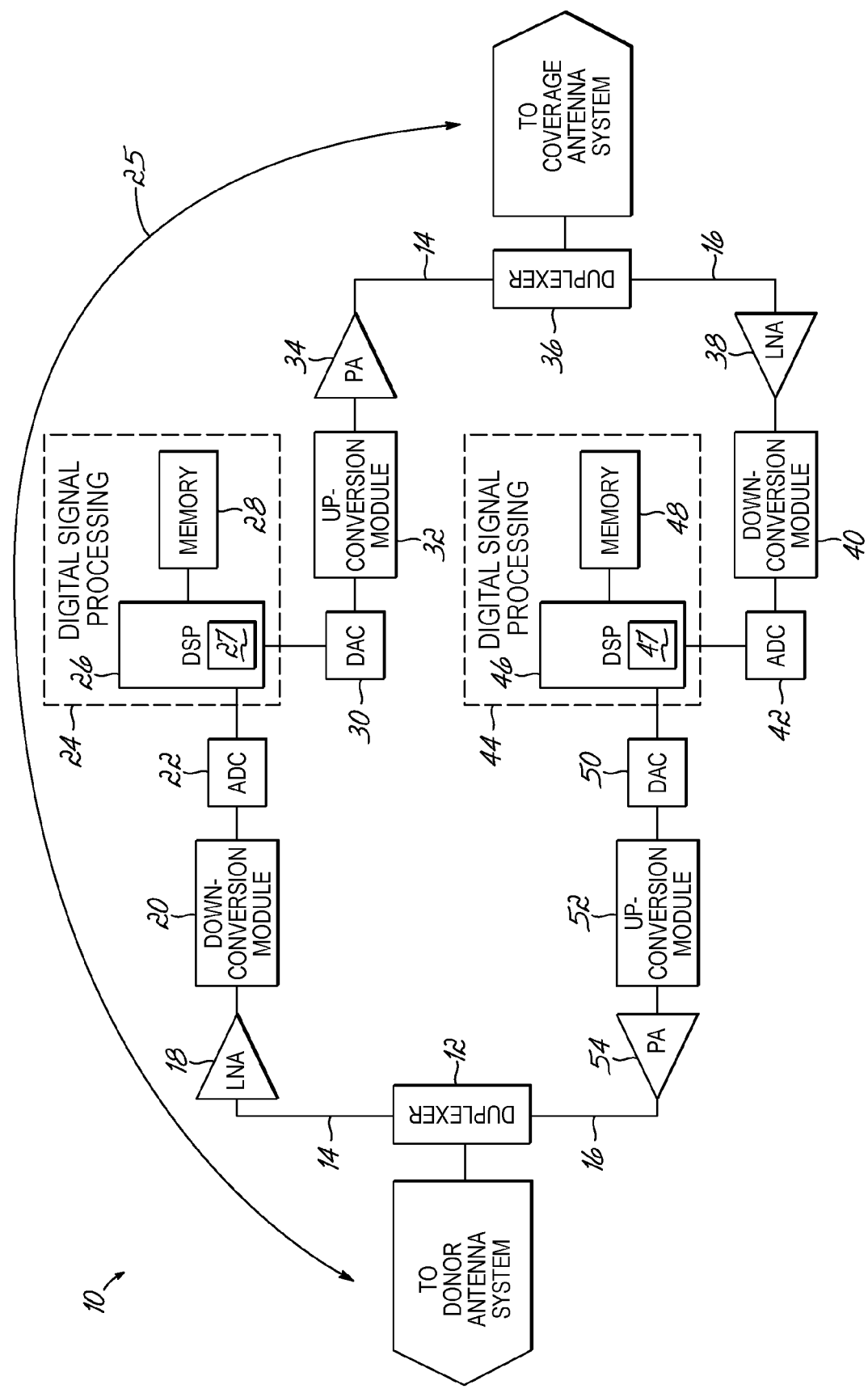
FIG. 2 is a circuit block diagram of one embodiment of the invention.

Turning to FIG. 2, wherein like numbers denote like parts throughout the several views, a circuit block diagram of an exemplary signal repeating system, such as repeater 10, is illustrated for use in a wireless communication system consistent with embodiments of the invention. Specifically, the repeater 10 is configured to facilitate communications between one or more base stations and one or more user equipment devices in the wireless communication system, as shown in FIG. 1. The repeater is thus in communication with a donor antenna 8 through at least one duplexer 12 and includes a downlink path 14 and an uplink path 16.

As illustrated in FIG. 2, the downlink path 14 of the repeater 10 includes a low-noise amplifier 18 (illustrated as "LNA" 18) as well as a frequency down-conversion module 20. The down-conversion module 20 includes appropriate mixers, amplifiers, and filters to perform frequency down conversion. Module 20 is in communication with an A/D converter 22. In turn, the A/D converter 22 is in communication with digital signal processing circuitry 24. The digital signal processing circuitry determines and provides an echo-cancellation filter arrangement for realizing the features of the invention.

The digital signal processing circuitry 24 may be realized, for example, by a Digital Signal Processor (DSP), and/or a Field-Programmable Gate Array (FPGA) and/or an Application Specific Integrated Circuit (ASIC). FIG. 2 illustrates the digital signal processing circuitry 24 includes a DSP 26 as well as memory components 28 within the downlink path for implementing the echo cancellation filter. The memory 28 may contain a program code that may be executed by the DSP 26 or other processing module and provides data that may be utilized by the DSP 26.

Figure 6:
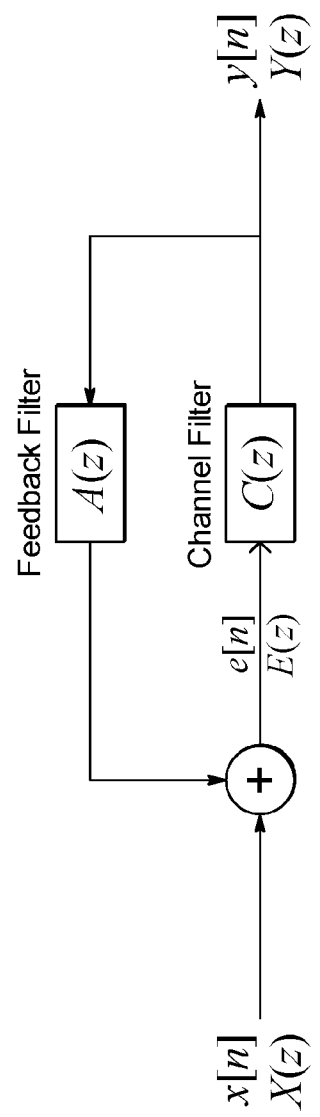
FIG. 6 is a diagram illustrating an equivalent model to the transfer function of FIG. 5 for the purpose of implementing the invention.

The digital signal processing circuitry 24 is configured to implement an adaptive cancellation approach for the downlink path 14 to mitigate the effects of unwanted multipath coupling 25. In the downlink path, the digital signal processing circuitry 24 implements a cancellation filter, a cancellation combiner, a channel filter, and an adaptation control module in the DSP 26, as illustrated in FIG. 6. The DSP 26 is in communication with a D/A converter 30 as well as an up-conversion module 32. The up-conversion module 32 is in communication with a power amplifier 34 (illustrated as "PA" 34) which is in communication with a duplexer 36. The duplexer 36 is in communication with the coverage antenna 9 to output the filtered downlink signal from the donor antenna 8.

As illustrated in FIG. 2, the repeater 10 includes a downlink path 14 and an uplink patch 16. The uplink path 16 is similar to the downlink path. In the uplink path, an LNA 38 is in communication with the duplexer 36 that is communication with the crossband coupler and/or coverage antenna. In turn, the LNA 38 is in communication with a frequency down-conversion module 40. An A/D converter 42 is in communication with the frequency down-conversion module 40 and digital signal processing circuitry 44. Digital signal processing circuitry 44 might also be realized, for example, by a Digital Signal Processor (DSP) and/or a Field-Programmable Gate Array (FPGA) and/or an Application Specific Integrated Circuit (ASIC). FIG. 2 illustrates that the digital signal processing circuitry 44 includes a DSP 46 as well as memory 48 for implementing an echo-cancellation filter. Similar to memory 28, the memory 48 contains program code that may be executed by the DSP 46 or other processing module and provides data that may be utilized by the DSP 46.

The second digital signal processing circuitry 44 is configured to implement an adaptive cancellation approach for the uplink path 16 to also mitigate the effects of unwanted multipath coupling. In the uplink path, the second digital signal processing circuitry 44, similarly to the first digital signal processing circuitry 24, implements a cancellation filter, a cancellation combiner, a channel filter, and an adaptation control module in the DSP 46. The DSP 46 is in communication with a D/A converter 50 which is in turn in communication with an up-conversion module 52. The up-conversion module 52 is in communication with a PA 54 which is in communication with the duplexer 12.

Thus, in the downlink path 14, the repeater 10 processes a signal received from, for example, a cellular communication base station and transmits the processed signal to, for example, a mobile end user device, such as a cell phone, portable computer, and/or other device that utilizes radio-frequency ("RF") communications. In the uplink path 16, the repeater 10 processes a signal received from, for example, the mobile end user device and transmits the processed signal to, for example, the cellular communication base station. As such, embodiments of the invention cancel unwanted multipath coupling in each of the respective paths.

In specific embodiments, the digital signal processing circuitry 24, 44 of the repeater 10 implements dynamically adjustable digital cancellation filters and other filters by generating Finite Impulse Response ("FIR") coefficients that are used to dynamically adjust the adjustable cancellation filters and other filters within the filter circuitry or components illustrated as elements 27 and 47. By dynamically adjusting the adjustable filters 27 and/or 47 with coefficients determined as described herein, the adaptive cancellation process is able to mitigate the effects of unwanted multipath coupling in the respective downlink and/or uplink paths 14 and/or 16. One having ordinary skill in the art will appreciate that the digital signal processing circuitry 24 and 44, shown as separate components in FIG. 2, may be performed, for example, by one or more combined or separate processing units, such as DSPs, FPGAs, and/or ASICs.

Figure 3:
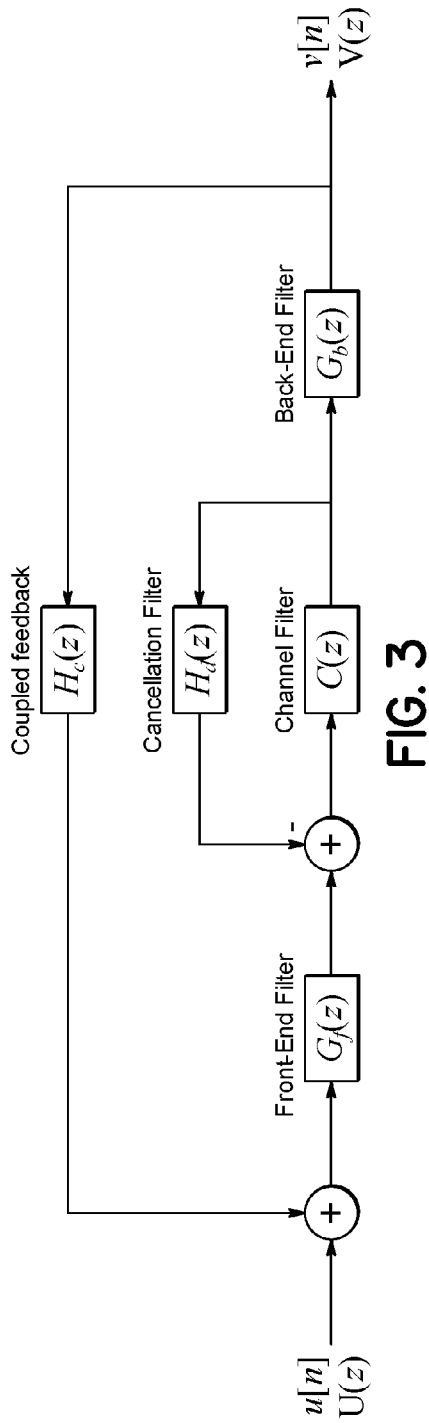
FIG. 3 is a diagram illustrating a downlink path of the communication system of FIG. 1 in a baseband equivalent form.

Specifically, FIG. 3 illustrates a signal path of repeater 10 in a baseband equivalent form. Several of the filters noted herein are provide through the digital signal processing circuitry 24, 44 of the invention for implementing a feedback filter that addresses echo cancellation and undesired multipath signals. As illustrated in FIG. 3, u[n] is the discrete-time representation of the signal received at the input of one of the antennas (e.g., donor antenna) of the repeater 10 and U(z) is the z-transform of the input signal u[n]. Likewise, v[n] is the discrete-time representation of the signal transmitted at the output of the repeater 10 (e.g., the coverage antenna) and V(z) is the z-transform of signal v[n]. The filter $G_f(z)$ represents the z-transform response of the analog front-end components of the repeater 10 in the paths 14, 16, which are represented, for example, in FIG. 2 as the LNAs 18, 38 and frequency down-conversion modules 20, 40 (with the A/D converters 22, 42 adding negligible or no impact to $G_f(z)$ such that it can generally be ignored). Similarly, the filter $G_b(z)$ represents the z-transform response of the analog back-end components of the repeater 10 in the paths 14, 16, which are represented, for example, in FIG. 2 as the frequency up-conversion modules 32, 52 and the PAs 34, 54 (with the D/A converters 30, 50 adding negligible or no impact to $G_b(z)$ such that it can generally be ignored). The digitally implemented channel filters reflected in the filter elements 27, 47, which are represented in the z-domain as C(z), limit the bandwidth of the repeater.

As illustrated in FIG. 2, the multipath coupling or feedback 25, which couples an output v[n] of one antenna to the input u[n] of another antenna, is modeled as an FIR filter in one embodiment of the invention. In the z-domain, the feedback transfer function is represented as $H_c(z)$. Such multipath coupling is typically undesired, as it may severely limit the performance of the repeater 10, as discussed above. In an effort to mitigate the multipath coupling or cancel any echo signal, a digital cancellation filter $H_d(z)$ is implemented which is effectively in parallel with the multipath coupling feedback filter $H_c(z)$. Signals from the cancellation filter would be destructively added in the signal path, as shown in FIG. 3. As such, one embodiment of the adaptive cancellation approach provides a method of estimating the filter coefficients, e.g., FIR coefficients $\{h_0, h_1, \ldots, h_M\}$, corresponding to cancellation filter $H_d(z)$, where $H_d(z)$ can be expressed as shown in Equation 1.

$$H_d(z) = h_0 + h_1 z^{-1} + \ldots + h_M z^{-M} \qquad \text{EQ. 1}$$

Figure 4:
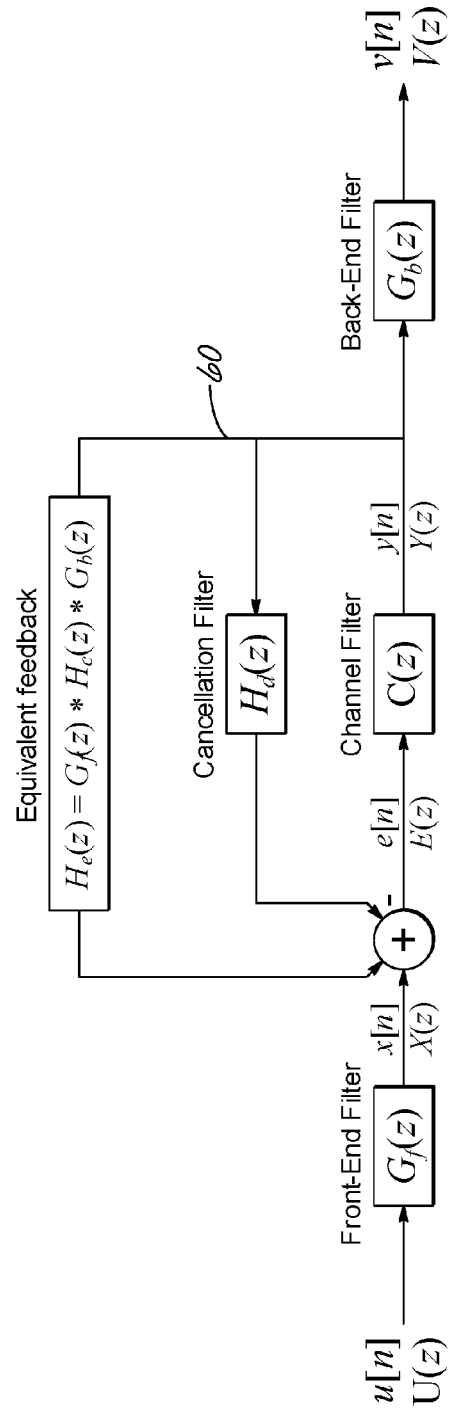
FIG. 4 is a diagram illustrating an equivalent feedback transfer function of the components of the communication system of FIG. 3.

FIG. 4 illustrates an equivalent block diagram to the one shown in FIG. 3 where the coupled feedback filter $H_c(z)$ has been replaced by an equivalent filter $H_e(z)$. Specifically, FIG. 4 highlights the requirements of the cancellation filter $H_d(z)$ in order for cancellation filter $H_d(z)$ to mitigate the multipath coupling effects (e.g., substantially cancel out the unwanted multipath coupling and echo signal). As illustrated in FIG. 4, to cancel out the effects of unwanted multipath coupling, cancellation filter $H_d(z)$ cancels out the effects of front-end filter $G_f(z)$, the coupled feedback $H_c(z)$, and the back-end filter $G_b(z)$. Therefore, in Equation 2, the coupled feedback $H_c(z)$ is combined with the front-end filter $G_f(z)$ and the backend filter $G_b(z)$ to form a equivalent feedback filter $H_e(z)$ reflected in Equation 2 below.

$$H_e(z) = G_f(z) H_c(z) G_b(z) \qquad \text{(EQ. 2)}$$

Figure 5:
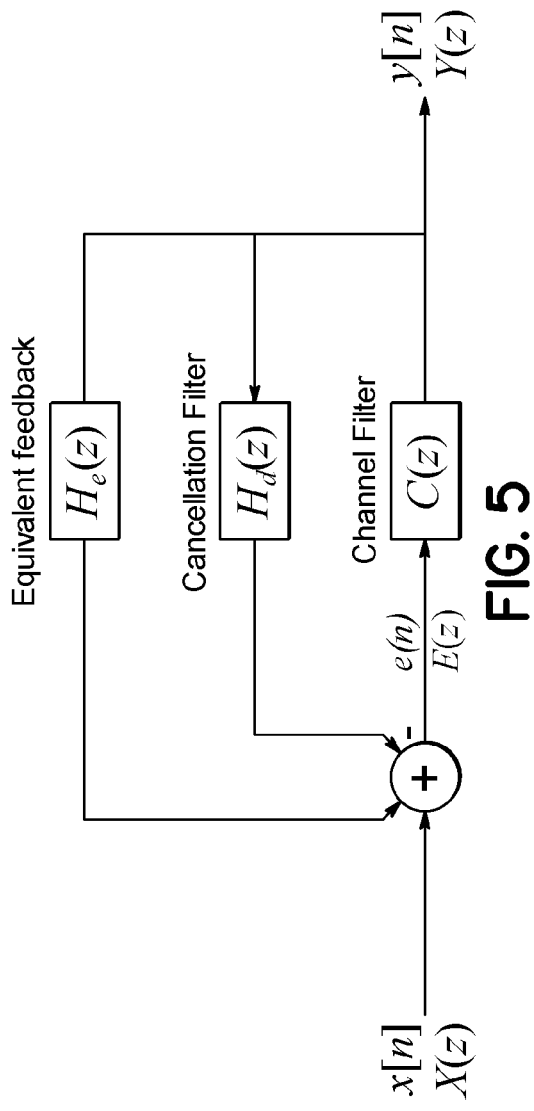
FIG. 5 is a diagram illustrating a simplified version of the transfer functions of FIG. 4.

By placing the equivalent filter $H_e(z)$ in parallel with the cancellation filter $H_d(z)$, as shown in FIG. 4 and when $H_d(z) = H_e(z)$, the effect of the multipath coupling, represented by equivalent feedback $H_e(z)$, is removed. In accordance with one embodiment of the invention and the method for estimating the coefficients for the cancellation filter $H_d(z)$, the filter responses that are not within the closed loop 60 are handled separately. To this end, FIG. 4 illustrates that the front-end filter $G_f(z)$ and the backend filter $G_b(z)$ are no longer within the closed loop 60. Because y[n] is the input to both the cancellation filter $H_d(z)$ and the equivalent feedback filter $H_e(z)$, it is considered as the output of the system and therefore, the backend filter $G_b(z)$ is of no consequence for the purpose of the filter coefficient estimation of the invention. In addition, x[n] is considered the input to the system since the effect of the front-end filter $G_f(z)$ can be easily handled as a simple variation of the invention and technique to be described. Therefore, one having ordinary skill in the art can consider a simplified system where x[n] is the input, y[n] is the output, and where $G_f(z)$ and $G_b(z)$ are omitted, as illustrated in FIG. 5 for the purposes of providing the invention.

Consistent with embodiments of the invention, it is not necessary to estimate the equivalent feedback filter $H_e(z)$ directly. In accordance with one aspect of the invention, the parallel combination $A(z)=H_e(z)-H_d(z)$ is estimated to provide an equivalent feedback filter. The use of an equivalent feedback filter $A(z)$ is justified when the cancellation filter $H_d(z)$ is updated by Equation 3, where $\hat{H}_d(z)$ is the updated version of $H_d(z)$.

$$\hat{H}_d(z)=H_d(z)+A(z) \qquad (\text{EQ. 3})$$

As such, it can be observed that:

$$H_e(z)-\hat{H}_d(z)=0 \qquad (\text{EQ. 4})$$

FIG. 6 thus illustrates an equivalent filter model to the filter model shown in FIG. 5, in which, based on the relationships described above with respect to Equation 2 through Equation 4, the equivalent feedback filter $H_e(z)$ and the cancellation filter $H_d(z)$ are replaced by an equivalent feedback filter $A(z)$. Thus, the estimation of the filter coefficients of $A(z)$ provides the above described FIR coefficients in accordance with embodiments of the invention.

As a practical matter, Equation 3 is augmented by digital signal processing circuitry (where $0<\mu<1$ is a real constant) to become Equation 5:

$$\hat{H}_d(z)=H_d(z)+\mu A(z) \qquad (\text{EQ. 5})$$

The variable $\mu$ is typically referred to as a learning constant and allows for the adaptation of the feedback filter to occur more slowly. This has the effect of reducing the amount of variability in the estimated filter coefficients according to aspects of the invention.

In accordance with one aspect of the invention, the filter coefficients for the feedback filter $A(z)$ are determined by estimation in the frequency domain or z-domain. To estimate the filter coefficients of $A(z)$, the error signal e[n] that is provided as input to channel filter $C(z)$ as shown in FIG. 6 is examined. The transfer function $H(z)=E(z)/X(z)$ from the input signal x[n] to the error signal e[n] can be found in the z-domain to be the following:

$$H(z) = \frac{E(z)}{X(z)} = \frac{1}{1 - C(z)A(z)} \qquad (\text{EQ. 6})$$

If $X(z)$ along with $E(z)$ were to be known, then the transfer function $H(z)$ can be computed and the coefficients of $A(z)$ estimated. However, in general the input signal $X(z)$, or the desired signal to be repeated, is not known. In lieu of knowing the exact input signal $X(z)$, the statistical properties of $X(z)$ are used. Thus, Equation 6 is rewritten in terms of $E(z)$.

$$E(z) = X(z)\frac{1}{1 - C(z)A(z)} \qquad (\text{EQ. 7})$$

Assuming that $X(z)$ is a white noise process and that $C(z)$ can be factored for some integer $d>0$ as shown in Equation 8, then $E(z)$ is generated by an Autoregressive (AR) process and the filter coefficients of $A(z)$ can be estimated from $E(z)$ using one of many AR estimation procedures.

$$C(z)=z^{-d}(c_0+c_1z^{-1}+c_2z^{-2}+\ldots) \qquad (\text{EQ. 8})$$

The restriction that $z^{-d}$ (i.e. pure delay) can be factored out of $C(z)$ is not very restrictive since most digitally implemented filters have additional delay added. However, in general $X(z)$ is not a white noise process but can be more accurately represented by $X(z)=S(z)+N(z)$ where $S(z)$ is the z-transform of the desired communication signals received by the repeater to be repeated (such as GSM, CDMA, etc.) and $N(z)$ is the z-transform of the input referenced thermal noise (i.e., noise signals). Thus, using Equation 7, $E(z)$ becomes the following in accordance with the invention:

$$E(z) = S(z)\frac{1}{1 - C(z)A(z)} + N(z)\frac{1}{1 - C(z)A(z)} \qquad (\text{EQ. 9})$$

The error signal $E(z)$ thus contains the desired communication signals $S(z)$, noise signals $N(z)$, and the effect of the multipath interference signals $H(z)$. Equation 9 is written in the frequency domain by letting $z=e^{j\omega}$, where $j=\sqrt{-1}$:

$$E(e^{j\omega}) = S(e^{j\omega})\frac{1}{1 - C(e^{j\omega})A(e^{j\omega})} + N(e^{j\omega})\frac{1}{1 - C(e^{j\omega})A(e^{j\omega})} \qquad (\text{EQ. 10})$$

By assuming that $N(e^{j\omega})$ is thermal noise, $N(e^{j\omega})$ can be considered a white noise process and thus the statistics are known. However, the statistics of $S(e^{j\omega})$ are in general not known. Since the input signal $S(e^{j\omega})$ is composed of band limited signals, there are regions where $S(e^{j\omega})\approx 0$. In these regions, Equation 10 becomes:

$$E(e^{j\omega}) \approx N(e^{j\omega})\frac{1}{1 - C(e^{j\omega})A(e^{j\omega})} \qquad (\text{EQ. 11})$$

Therefore, for frequency ranges of $\omega$ where $S(e^{j\omega})\approx 0$, we see that the Fourier transform $E(e^{j\omega})$ of the data sequence e[n] is again represented in the form of an autoregressive (AR) function. This observation is utilized to estimate the filter coefficients of $A(z)$. Since there is a finite number of filter coefficient parameters in $A(e^{jw})$ to estimate, only a finite number of $\omega_k$ values (where $S(e^{j\omega})\approx 0$) are needed.

In one embodiment of the invention, the coefficients of $A(z)$ are estimated using a frequency domain version of the classical linear prediction technique. The invention and this technique differ from the classical linear prediction techniques in that frequency domain values are used instead of time domain values. In addition, in one embodiment, only frequency domain values of $E(e^{j\omega})$ corresponding to $S(e^{j\omega})\approx 0$ are utilized. In an alternative embodiment of the invention, the values of $E(e^{j\omega})$ corresponding to $S(e^{j\omega})\neq 0$ are interpolated, such that linear predication can be used over the entire band.

Common to both exemplary autoregressive estimation techniques disclosed above is the need for the power spectral density $P_{ee}(\omega)$ of e[n]. In accordance with one aspect of the invention, the power spectrum or power spectral density $P_{ee}(\omega)$ of the measured error signal e[n] is computed. Although many possibilities exist for estimating the power spectral density, a scaled version of a Welch Periodogram method may be used, as it can be easily implemented using a Fast Fourier Transform (FFT). The power spectral density at the radian frequency $$\omega_k = \frac{2\pi}{N}k$$

is given by the following Equation, where N is the block length, L is the overlap, K is the number of blocks to average and w[n] is a N-point window function:

$$P_{ee}(k) = \sum_{m=0}^{K-1} \left| \sum_{n=0}^{N-1} w[n]e[n+mL]e^{-j\frac{2\pi}{N}kn} \right|^2 \quad \text{(EQ. 12)}$$

Examples of the window function w[n] include the Bartlett, Blackman, Chebyshev functions and others. The choice of window function is largely dependent on the expected spectral shape of $P_{ee}(k)$. It should be noted that this disclosed version of the power spectral density estimator is a scaled version of the classical Welch Periodogram estimator. This version is used since the autoregressive techniques presented in accordance with the invention are insensitive to scaling.

In accordance with another aspect of the invention, a response of the multipath coupling interference is estimated by processing the power spectrum of the measured error signal using autoregressive estimation in the frequency domain. As can be seen from Equations 10 and 12, the values $P_{ee}(k)$ can be represented parametrically as the following, where $P_{ee}(k)$ represents the power spectral density of the signal S(z) and $P_{nn}(k)$ represents the power spectral density of the noise signal N(z):

$$P_{ee}(k) = P_{ss}(k)\frac{1}{|1-C(e^{j\omega_k})A(e^{j\omega_k})|^2} + P_{nn}(k)\frac{1}{|1-C(e^{j\omega_k})A(e^{j\omega_k})|^2} \quad \text{(EQ. 13)}$$

As stated previously, $S(e^{j\omega_k})\approx 0$ and hence $P_{ss}(k)\approx 0$ for some values of k since the signals that comprise S(z) are bandlimited. For these values of k, $P_{ee}(k)$ has only a noise component whereas the remaining values of k have both a signal and a noise component. Therefore, the power spectral density values $P_{ee}(k)$ for k=0, 1, ..., N−1 can be divided into two groups: one group contains the $P_{ee}(k)$ values that are comprised of both a signal component and a noise component, and the other group contains the $P_{ee}(k)$ values which are comprised of only a noise component. One way in which this separation can be accomplished is by the use of a threshold value. To this end, two index sets can be defined as:

$$N=\{k:P_{ee}(k)<T\} \quad \text{(EQ. 14)}$$

$$S=\{k:P_{ee}(k)\geq T\} \quad \text{(EQ. 15)}$$

In Equations 14 and 15, T is the threshold value, $S\cup N=\{0, 1, ..., N-1\}$ and $S\cap N=\emptyset$. The first set of frequencies contained in the index set N corresponds to the case when $P_{ee}(k)$ contains only a noise component. The second set of frequencies contained in the index set S corresponds to the case when $P_{ee}(k)$ has both desired communication signal components and noise components.

One embodiment for estimating the filter coefficients of A(z) is based on linear prediction in the frequency domain. It can be noted that when $N=\{0, 1 ..., N-1\}$ this embodiment is then consistent with classical linear prediction in the frequency domain. In this method, the prediction error power $\rho^2$, as shown in Equation 16, is minimized as a function of the filter coefficients of A(z) at a discrete set of frequencies given by N.

$$\rho^2 = \min_a \sum_{k\in N} |H^{-1}(z_k \mid a)|^2 P_{ee}(k) \quad \text{(EQ. 16)}$$

The function $H^{-1}(z_k|a)$ is the inverse of the transfer function shown in Equation 6 evaluated at the angular frequency $$z_k = e^{j\frac{2\pi}{N}k}$$

and $P_{ee}(k)$ is the power spectral density shown in Equation 13. The prediction error power is quadratic in the filter coefficients a and therefore has a unique solution. The solution can be found by solving an associated weighted linear least squares problem. Specifically, for vectors $w(z_k)=[1, z_k^{-1}, ..., z_k^{-M}]^T$ and $a=[a_0, a_1, ..., a_M]^T$ where $[\bullet]^T$ represent the transpose, the polynomial $A(z_k)$ is defined, where $[\bullet]^H$ represent the complex conjugate transpose, as follows:

$$A(z_k) = a_0 + a_1 z_k^{-1} + ... + a_M z_k^{-M} \quad \text{(EQ. 17)}$$

$$= w^H(z_k)a$$

Next, the diagonal matrices $C=\text{diag}([C(z_k)])$ and $P=\text{diag}([P_{ee}(k)])$ D are defined, and the matrix $W=[w(z_k)]$ is defined for $k\in N$, and finally the diagonal matrix $1=\text{diag}(1, 1, ..., 1)$ which has the same size as C and P is defined. Equation 16 can thus be rewritten in matrix/vector form.

$$\rho^2 = \min_a (CW^H a - 1)^H P(CW^H a - 1) \quad \text{(EQ. 18)}$$

A plurality of filter coefficients, such as contained in the vector a, are then computed for the estimated response from processing the power spectrum of the measured error signal using autoregressive estimation in the frequency domain as dicussed above. The unique solution for a which minimizes $\rho^2$ in a least-squares sense can be readily obtained as:

$$a=(WC^H PCW^H)^{-1}WC^H P1 \quad \text{(EQ. 19)}$$

The cancellation filter coefficients defined in vector a are then used to define the desired feedback filter $A(z_k)=w^H(z_k)a$. Once the feedback filter is defined, the feedback filter $A(z_k)$ can be implemented as illustrated in FIG. 6 by applying the filter coefficients to an adjustable filter that generates a cancellation signal to at least partially mitigate multipath coupling in the signal path, e.g., the uplink path or the downlink path, for which the cancellation filter coefficients were determined. It will be appreciated that the filter coefficients may be computed and applied to the adjustable filter in the digital or analog domain.

In alternative embodiments, the filter coefficients of A(z) are estimated again based on linear prediction in the frequency domain, with the exception that the regions associated with the signals are interpolated instead of being excluded. If we consider the power spectral density $P_{ee}(k)$ for values of $k\in N$, (i.e. noise only components), Equation 13 reduces to:

$$P_{ee}(k) = \frac{\sigma^2}{|1 - C(x_k)A(z_k)|^2} \quad \text{(EQ. 20)}$$

This is because $P_{ss}(k)=0$ and $P_{nn}(k)=\sigma^2$ when N(z) is a consider to be Gaussian noise. Thus, over a range of k in which it is reasonable to approximate the product $|C(z_k)A(z_k)|$ by a constant, Equation 20 is transformed to:

$$P_{ee}^{-1}(k) = \frac{1}{\sigma^2}|1 - \gamma z^{-\tau}|^2 \quad \text{(EQ. 21)}$$

where the delay τ has been factored out and γ is a complex constant. Equation 21 can then be expanded to the following:

$$P_{ee}^{-1}(k) = \frac{1 - |\gamma|^2}{\sigma^2} - \frac{2|\gamma|}{\sigma^2}\cos(\omega\tau + \theta) \quad \text{(EQ. 22)}$$

Therefore, $P_{ee}^{-1}(k)$ can be approximated by an offset cosine over a range of k in which $|C(z_k)A(z_k)|$ is approximately constant.

The index set S can be broken up into a number of smaller subsets $S_i$. Each subset $S_i=\{k_i, k_i+1, k_i+2, \ldots\}$ contains consecutive values of k and are disjoint $S_i \cap S_j = \emptyset$ for $i \neq j$. Thus the index set S can be written as follows:

$$S = \bigcup_{i=1}^{N_s} S_i \quad \text{(EQ. 23)}$$

Each $S_i$ can be thought of as corresponding to a closed region of $P_{ee}(k)$ that is comprised of a signal and a noise component. These regions may not be modeled by an autoregressive function since they have a signal component as well as a noise component. However, they can be interpolated as if they were autoregressive. To this end, a modified or combined power spectral density $\hat{P}_{ee}(k)$ is defined as $$\hat{P}_{ee}(k) = \begin{cases} P_{ee}(k) & , k \in N \\ \dfrac{1}{a_i + b_i\cos(\omega_i k + \theta_i)} & , k \in S_i \end{cases} \quad \text{(EQ. 24)}$$

where the values $\{a_i, b_i, \omega_i, \theta_i\}$ can be determine by curve fitting using the points adjacent to $S_i$. With the combined power spectral density, autoregressive estimation techniques such as linear prediction in the frequency domain discussed above, can again be used to estimate the filter coefficients of A(z) using the following:

$$\rho^2 = \min_a \sum_{k=0}^{N-1} |H^{-1}(z_k \mid a)|^2 \hat{P}_{ee}(k) \quad \text{(EQ. 25)}$$

This form of the prediction error power is essentially the same as that shown in Equation 16, with the exception that N points are used along with interpolating the signal regions of $P_{ee}(k)$.

In accordance with another aspect of the invention, the effects of the front end filter $G_f(z)$ in FIG. 4 may be accommodated with a slight variation of the proposed autoregressive techniques. Both embodiments may use the power spectral density $P_{ee}(k)$ of the signal E(z) where it was assumed that x[n] was thermal noise and hence could be modeled as white Gaussian noise. In reality, it is the input signal U(z) that can be more appropriately modeled as thermal noise and thus X(z) is no longer spectrally white. However, the power spectral density $P_{ee}(k)$ can be written as $$P_{ee}(k)=(P_{ss}(k)+P_{nn}(k))|G_f(e^{j\omega_2})H(e^{j\omega_k})|^2 \quad \text{(EQ. 26)}$$

where $H(e^{j\omega_k})$ is defined in Equation 6. Thus, letting $$\overline{P}_{ee}(k)=P_{ee}(k)|G_f(e^{jw_k})|^{-2} \quad \text{(EQ. 27)}$$

Equation 26 becomes $$\overline{P}_{ee}(k)=(P_{ss}(k)+P_{nn}(k))|H(e^{j\omega_k})|^2 \quad \text{(EQ. 28)}$$

which is in the form of the original power spectral density. Therefore, the autoregressive technique can be utilized by replacing $P_{ee}(k)$ with $\overline{P}_{ee}(k)$.

A person having ordinary skill in the art will recognize that the environments illustrated in FIG. 1-6 are not intended to limit the scope of embodiments of the invention. In particular, a wireless communication system that includes a repeater 10 and/or the repeater 10 itself may include fewer or additional components, and/or be communicably coupled to more or fewer components consistent with alternative embodiments of the invention. Indeed, a person having skill in the art will recognize that other alternative hardware and/or software environments may be used without departing from the scope of the invention. As such, other alternative hardware and software environments may be used without departing from the scope of embodiments of the invention.

The routines executed to implement the digital signal processing circuitry of the embodiments of the invention, whether implemented as part of an operating system or a specific application, component, program, object, module or sequence of instructions executed by one or more digital signal processing components computing systems or components have been disclosed and referred to herein as a "sequence of operations" or, more simply, "program code". The program code typically comprises one or more instructions that are resident at various times in various memory and storage devices in a repeater or computing system, and that, when read and executed by one or more processors of the repeater or computing system, cause that repeater or computing system to perform the steps necessary to execute steps, elements, and/or blocks embodying the various aspects of the invention.

While embodiments of the invention have been described in the context of fully functioning repeaters and related systems, those skilled in the art will appreciate that the various embodiments of the invention are capable of being distributed as a program product in a variety of forms, and that the invention applies equally regardless of the particular type of computer readable signal bearing media used to actually carry out the invention. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code may be identified based upon the application or software component within which it is implemented in a specific embodiment of the invention. However, it should be appreciated that any particular program and digital signal processing nomenclature is used merely for convenience, and thus the invention should not be limited to use solely in any specific application identified and/or implied by such nomenclature. Furthermore, given the typically endless number of manners in which programs run by digital signal processing circuitry may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, while embodiments of the invention have been illustrated by a description of the various embodiments and the examples, and while these embodiments have been described in considerable detail, it is not the intention of the applicants to restrict or in any way limit the scope of the appended claims to such detail. For example, some aspects of the invention have been discussed with respect to a repeater. However, and as discussed above, embodiments of the invention may be implemented with a distributed antenna system, such as a SISO, SIMO, MISO, or MIMO distributed antenna system. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

The invention lies in the claims hereinafter appended.

What is claimed is:

1. A method of mitigating multipath coupling interference in a communication system comprising:
    measuring an error signal in a signal path of the communication system, wherein the error signal contains desired communication signals, noise signals, and multipath coupling interference signals;
    computing a power spectrum of the measured error signal;
    estimating a response of the multipath coupling interference by processing the power spectrum of the measured error signal using autoregressive estimation in a frequency domain that is performed using linear prediction in the frequency domain by minimizing, at a discrete set of frequencies, a prediction error power associated with the measured error signal;
    computing a plurality of FIR filter coefficients from the estimated response;
    applying the plurality of filter coefficients to an adjustable filter that generates a cancellation signal used to at least partially mitigate the multipath coupling interference signals.

2. The method of claim 1, wherein the autoregressive estimation estimates the response of the multipath coupling interference by minimizing the power spectrum of the measured error signal.

3. The method of claim 1, further comprising:
    identifying a first set of frequencies where the power spectrum of the measured error signal is predominately associated with the noise signals.

4. The method of claim 3, wherein the response of the multipath coupling interference is estimated by processing the power spectrum of the measured error signal using autoregressive estimation in the frequency domain at the first set of frequencies.

5. The method of claim 3, further comprising:
    identifying a second set of frequencies where the power spectrum of the measured error signal is predominately associated with the noise signals as well as the desired communication signals,
    estimating a power spectrum of the measured error signal at the frequencies in the second set of frequencies using the power spectrum values associated with the first set of frequencies, and
    forming a combined power spectrum which is composed of the power spectrum of the measured error signal at the frequencies in the first set of frequencies and the estimated power spectrum at the frequencies in the second set of frequencies.

6. The method of claim 5, wherein the response of the multipath coupling interference is estimated by processing the combined power spectrum using autoregressive estimation in the frequency domain.

7. The method of claim 1, wherein the communication system is a signal repeating system.

8. The method of claim 7, wherein the signal repeating system is one of a repeater or a distributed antenna system.

9. The method of claim 7, further comprising:
    transmitting the error signal via an antenna of the signal repeating system.

10. The method of claim 1, wherein the communication system is a same frequency signal repeating system.

11. The method of claim 1, wherein the communication system is a frequency translating signal repeating system.

12. The method of claim 1, wherein applying the plurality of filter coefficients is performed in a digital domain.

13. The method of claim 1, wherein applying the plurality of filter coefficients is performed in an analog domain.

14. An apparatus, comprising:
    an adjustable filter; and
    processing circuitry coupled to the adjustable filter, the processing circuitry configured to:
        measure an error signal in a signal path of the apparatus, wherein the error signal contains desired communication signals, noise signals, and multipath coupling interference signals;
        compute a power spectrum of the measured error signal;
        estimate a response of the multipath coupling interference by processing the power spectrum of the measured error signal using autoregressive estimation in a frequency domain that is performed using linear prediction in the frequency domain by minimizing, at a discrete set of frequencies, a prediction error power associated with the measured error signal;
        compute a plurality of FIR filter coefficients from the estimated response; and
        apply the plurality of filter coefficients to the adjustable filter to generate a cancellation signal used to at least partially mitigate the multipath coupling interference signals.

15. The apparatus of claim 14, wherein the autoregressive estimation estimates the response of the multipath coupling interference by minimizing the power spectrum of the measured error signal.

16. The apparatus of claim 14, wherein the processing circuitry is further configured to identify a first set of frequencies where the power spectrum of the measured error signal is predominately associated with the noise signals.

17. The apparatus of claim 16, wherein the response of the multipath coupling interference is estimated by processing the power spectrum of the measured error signal using autoregressive estimation in the frequency domain at the first set of frequencies.

18. The apparatus of claim 16, wherein the processing circuitry is further configured to identify a second set of frequencies where the power spectrum of the measured error signal is predominately associated with the noise signals as well as the desired communication signals, estimate a power spectrum of the measured error signal at the frequencies in the second set of frequencies using the power spectrum values associated with the first set of frequencies, and form a combined power spectrum which is composed of the power spectrum of the measured error signal at the frequencies in the first set of frequencies and the estimated power spectrum at the frequencies in the second set of frequencies.

19. The apparatus of claim 18, wherein the response of the multipath coupling interference is estimated by processing the combined power spectrum using autoregressive estimation in the frequency domain.

20. The apparatus of claim 14, wherein the apparatus is a signal repeating system.

21. The apparatus of claim 20, wherein the signal repeating system is one of a repeater or a distributed antenna system.

22. The apparatus of claim 21, further comprising:
an antenna,
wherein the processing circuitry is further configured to transmit the error signal via the antenna.

23. The apparatus of claim 22, wherein the apparatus is a same frequency signal repeating system.

24. The apparatus of claim 14, wherein the apparatus is a frequency translating signal repeating system.

25. The apparatus of claim 14, wherein the processing circuitry is configured to apply the plurality of filter coefficients to the adjustable filter in a digital domain.

26. The apparatus of claim 14, wherein the processing circuitry is configured to apply the plurality of filter coefficients to the adjustable filter in an analog domain.

* * * * *